(No Model.) 6 Sheets—Sheet 1.

A. HERR.
METHOD OF SEPARATING GARLIC FROM WHEAT.

No. 408,618. Patented Aug. 6, 1889.

ATTEST.
J. Henry Kaiser
E. Everett Ellis

INVENTOR.
Austin Herr
By
Hm C. Hw. Intere
Atty.

(No Model.) 6 Sheets—Sheet 2.

A. HERR.
METHOD OF SEPARATING GARLIC FROM WHEAT.

No. 408,618. Patented Aug. 6, 1889.

ATTEST.
J. Henry Kaiser.
E. Everett Ellis.

INVENTOR.
Austin Herr
By (No Model.) 6 Sheets—Sheet 3.

A. HERR.
METHOD OF SEPARATING GARLIC FROM WHEAT.

No. 408,618. Patented Aug. 6, 1889.

ATTEST.
J. Henry Kaiser
E. Everett Ellis

INVENTOR
Austin Herr
By
Wm. Crew Inture
Atty (No Model.) 6 Sheets—Sheet 4.

A. HERR.
METHOD OF SEPARATING GARLIC FROM WHEAT.

No. 408,618. Patented Aug. 6, 1889.

(No Model.) 6 Sheets—Sheet 6.

A. HERR.
METHOD OF SEPARATING GARLIC FROM WHEAT.

No. 408,618. Patented Aug. 6, 1889.

ATTEST.
J. Henry Kaiser.
E. Everett Ellis.

INVENTOR
Austin Herr
By Wm. C. true Intire
Att'y

UNITED STATES PATENT OFFICE.

AUSTIN HERR, OF WASHINGTON, DISTRICT OF COLUMBIA.

METHOD OF SEPARATING GARLIC FROM WHEAT.

SPECIFICATION forming part of Letters Patent No. 408,618, dated August 6, 1889.

Application filed December 29, 1886. Serial No. 222,911. (No model.)

*To all whom it may concern:*

Be it known that I, AUSTIN HERR, a citizen of the United States, residing at Washington, (Georgetown,) in the District of Columbia, have invented new and useful Improvements in Methods of Separating Garlic from Wheat, of which the following is a specification.

This invention relates to certain new and useful improvements in processes for separating garlic from wheat, the same to be hereinafter more particularly described, and pointed out in the claims. A number of methods or processes have been heretofore devised having similar objects in view; but, so far as I am aware, none have proven effectual in completely removing the garlic, and there are always discoverable traces thereof left remaining. It is well known that as received into the mill winter wheat is always found to contain a greater or less percentage of this objectionable substance—garlic—which from its characteristic composition and acrid taste will yield upon grinding a most offensively-smelling oil, that injures the valuable properties of the wheat, besides coating the burrs or rolls with a glazed surface, which not only destroys their efficiency as granulators of wheat, but also reduces their capacity. It is evident that every trace of this objectionable vegetable should be eliminated.

The object of this invention is to provide a process by which the garlic is separated from wheat so effectually that not even the slightest odor or taste thereof is left in the wheat, thereby accomplishing in this class of inventions a result never heretofore attained.

In the accompanying drawings I have represented one form of apparatus for carrying out my improved process, and wherein—

Figure 1:
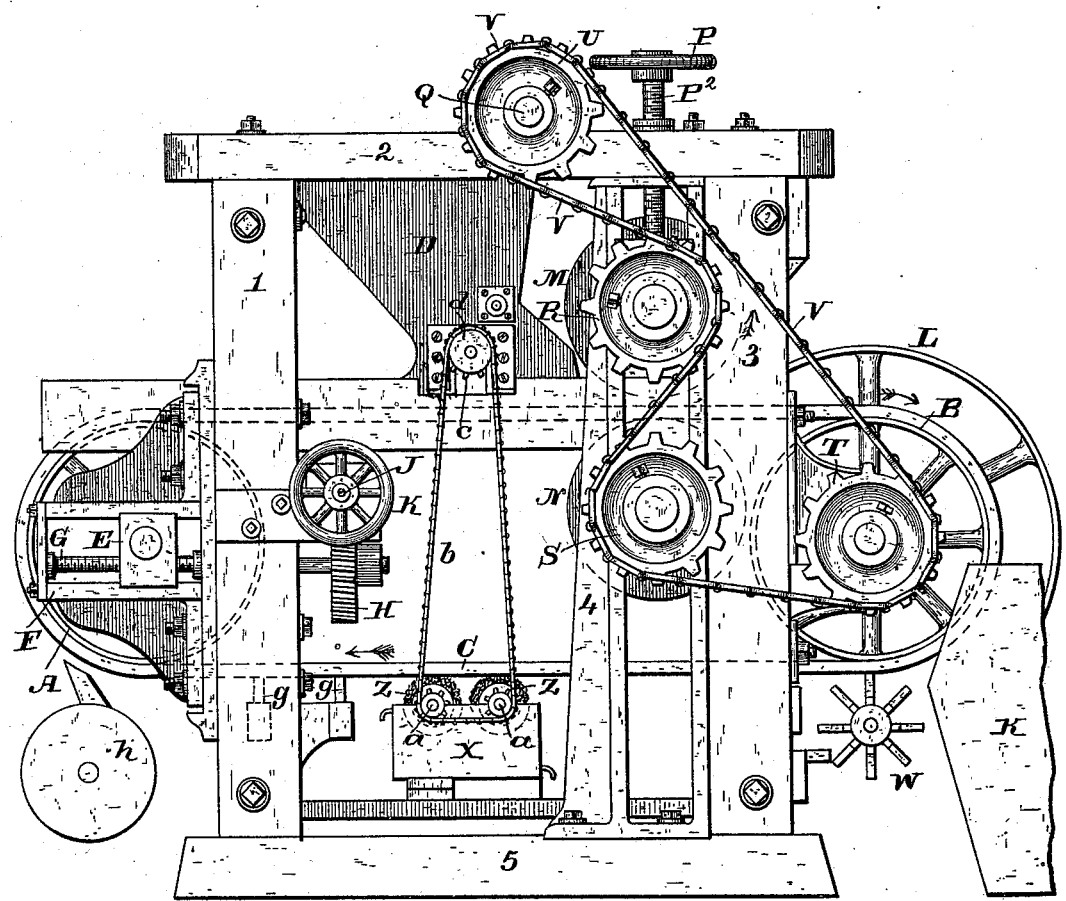
Figure 2:
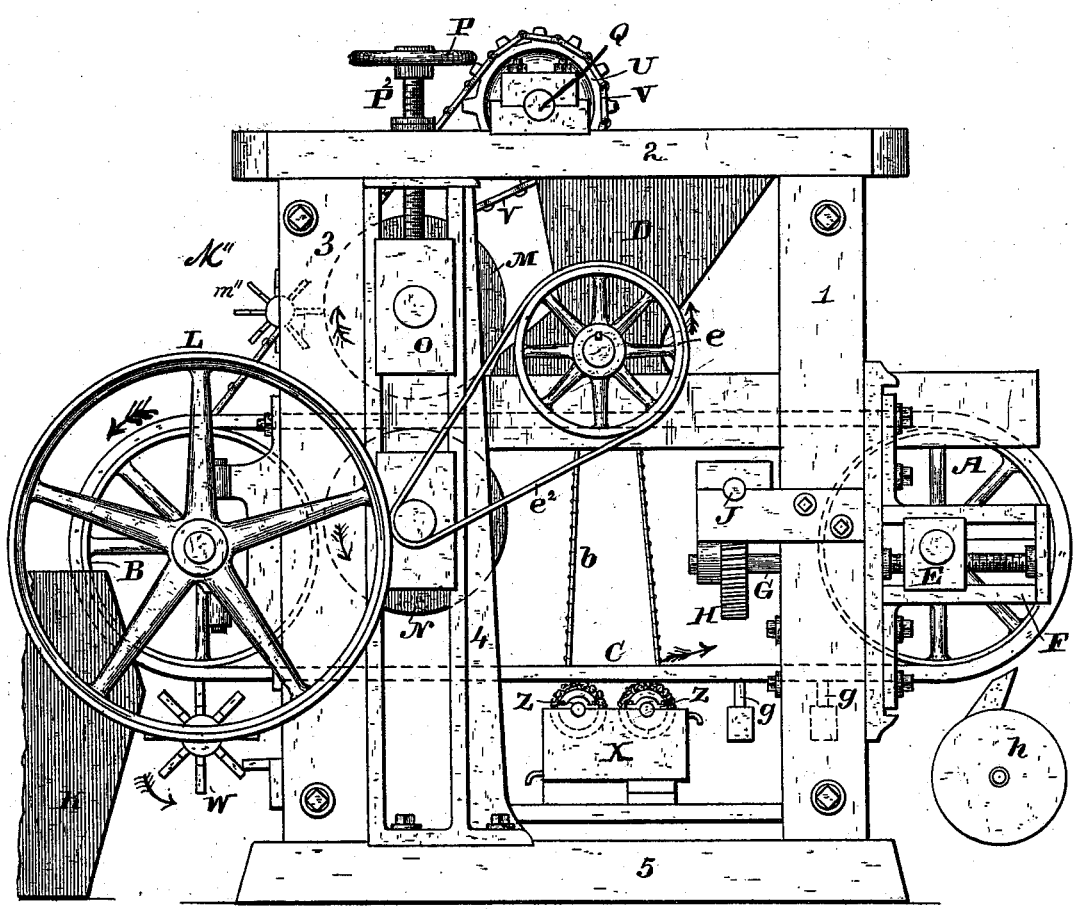
Figure 3:
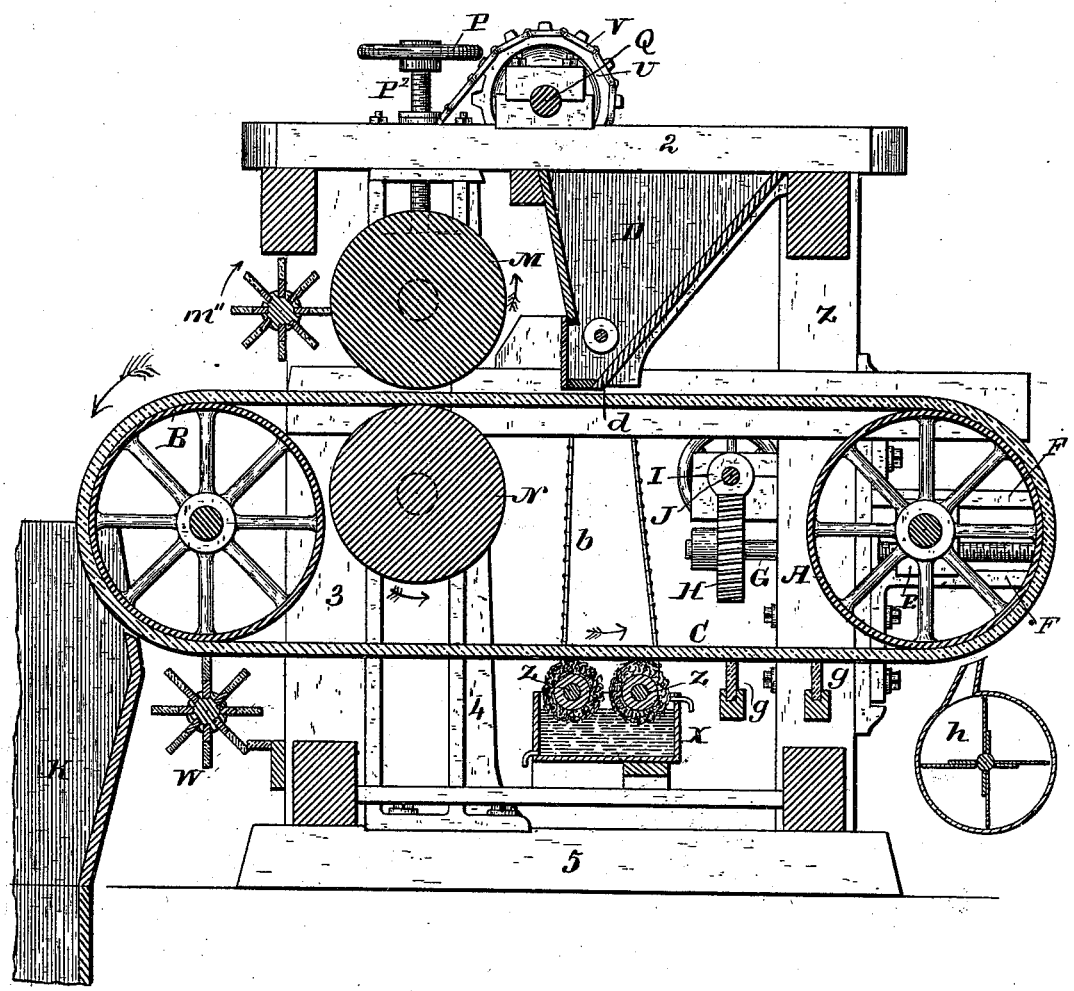
Figure 4:
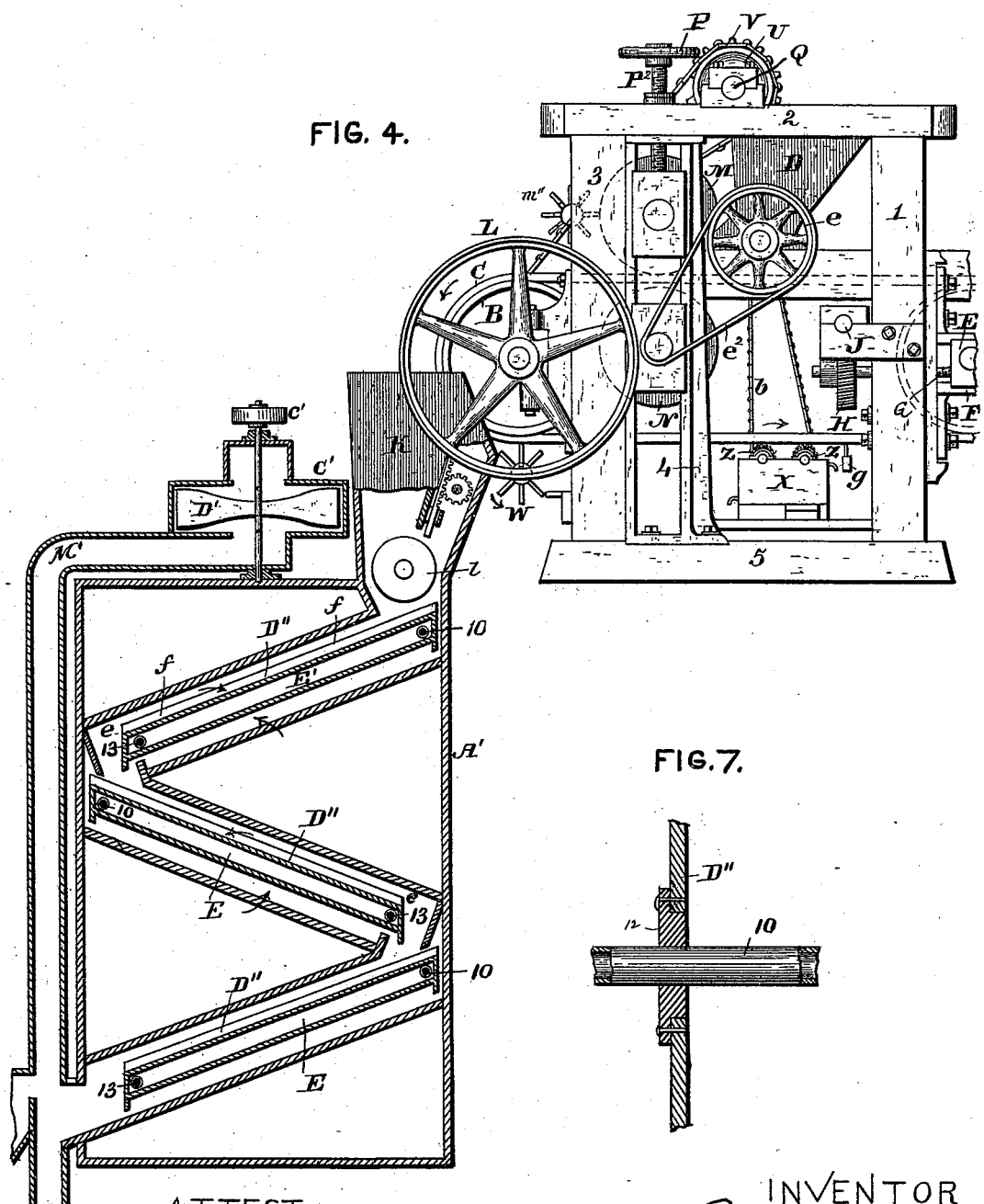
Figure 5:
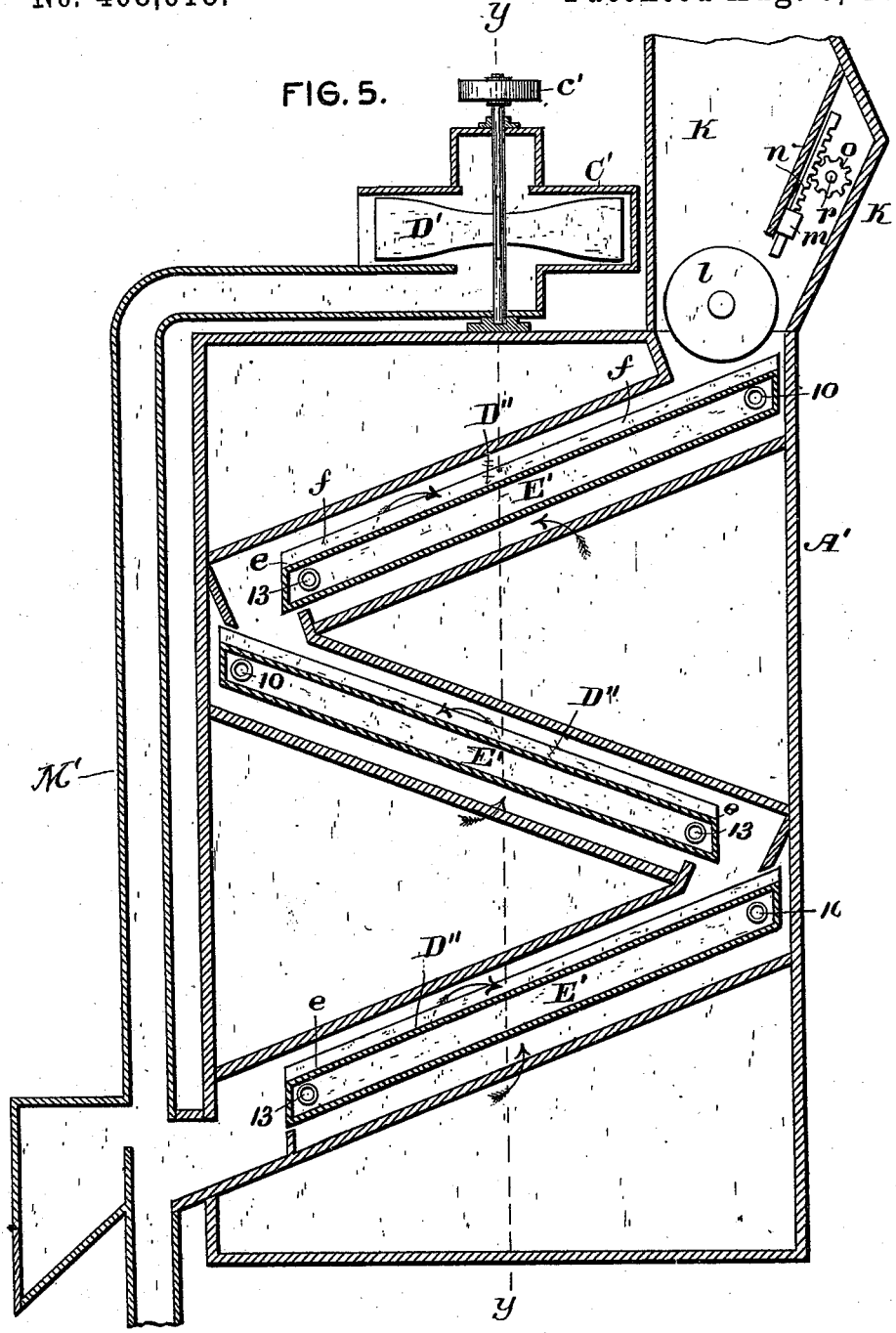
Figure 6:
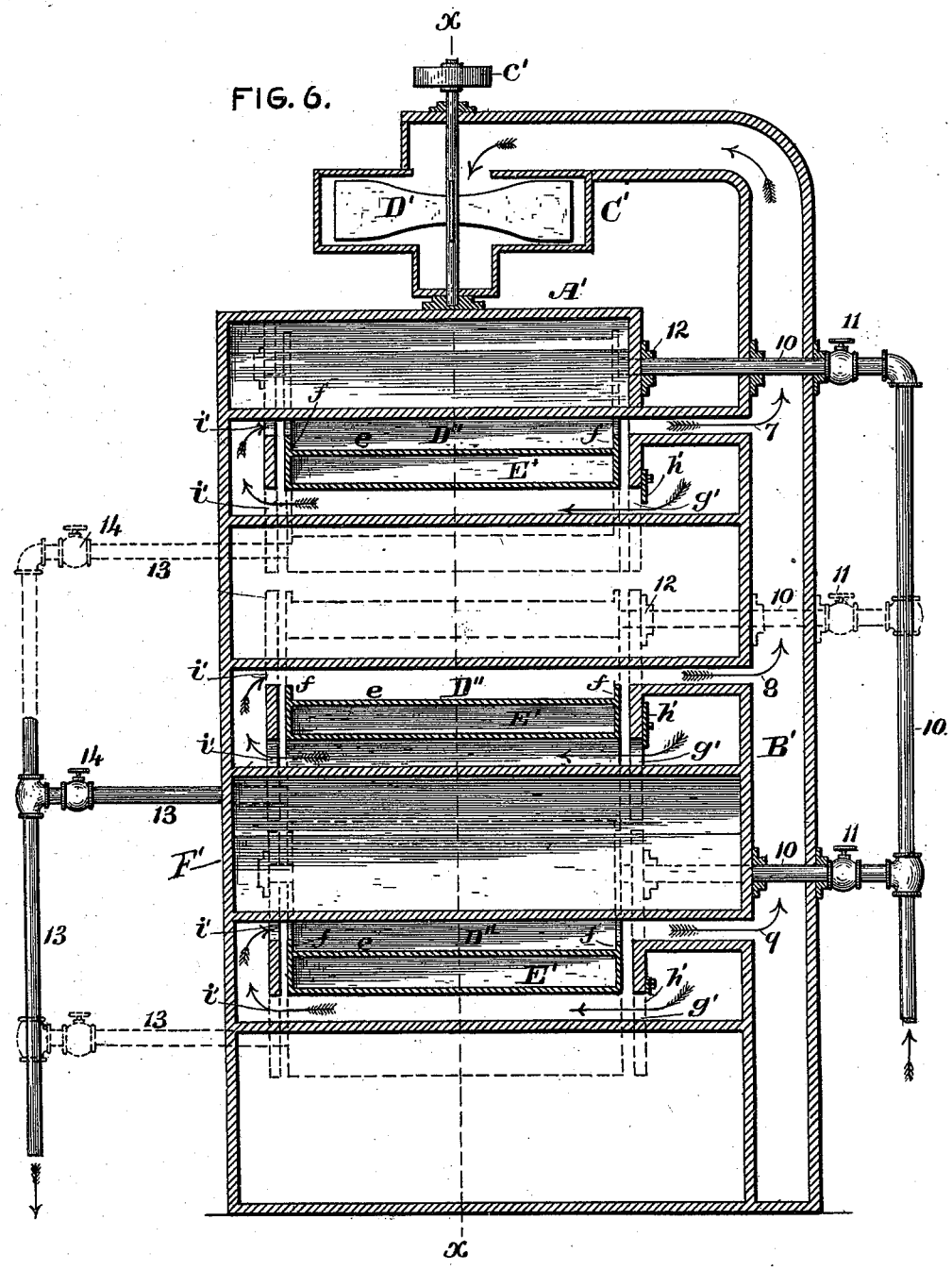

Figure 1 represents a vertical longitudinal elevation of the crushing apparatus employed in the practice of my process. Fig. 2 is a similar view taken from the opposite side thereof. Fig. 3 is a vertical longitudinal sectional view of Fig. 2. Fig. 4 represents a vertical side elevation of a portion of the machine as shown by Fig. 2, together with a vertical sectional elevation of the evaporating apparatus employed in conjunction therewith for carrying my invention into effect. Fig. 5 is an enlarged sectional elevation, on the line $x\ x$ of Fig. 6, of the evaporating apparatus, also shown in the preceding figure. Fig. 6 is a vertical sectional elevation of the evaporating apparatus on the line $y\ y$, Fig. 5. Fig. 7 is a sectional detail.

In the practice of my invention the wheat is delivered through a suitable feed-hopper upon the surface of a traveling belt, which is made to pass between two revolving rolls for the purpose of mashing the bulbs or cuticle of garlic without at all crushing or injuring the grain. This belt is constructed of some elastic material—such as partially-vulcanized india-rubber—so that in the passage of the belt between the rolls the grains of wheat will be pressed or embedded into the material of the belt, while the bulbs or cuticle of garlic will be mashed or crushed on the surface thereof, and then immediately after the impressed portion of the belt is free of the rolls the embedded grain will be loosened or freed by the elastic or resilient nature of the belt material and permitted to precipitate itself into a receiving-hopper provided therefor. For the purpose of maintaining the belt sufficiently taut and to enable the same to be so regulated as that its fibers will be either contracted or expanded to the required degree for accomplishing the end desired I have provided certain adjusting mechanism therefor, and also have I provided adjusting devices for one of the rolls through which this belt passes, by which greater or diminished pressure upon the belt may be had. Further, I resort to certain scraping and cleaning devices by which the belt is freed of the adherence of both the pulp and juices of the garlic, and gaining thereby the maximum extent of cleansed surface thereof, by which the said belt is always in a condition to receive a supply of material. Finally, in order to free the grain of any juices of the garlic which may be received on its surfaces as the material is undergoing passage between the rolls, I pass the same through suitable evaporating apparatus, by which the said oil or juices are converted into vapor and thence conducted off to the outer or external atmosphere. Finally, I resort to such other operations as will more fully appear hereinafter; but it should be understood that in the present application I lay no claim to other than the process or method of separation, such apparatus as I have herein shown being claimed in separate applications for Letters Patent filed by me on the 29th day of March, 1887, having Serial Nos. 268,843 and 268,844, respectively.

Reference being had to the several parts by the letters marked thereon, 1, 2, 3, and 4 represent different parts of the frame-work of the crushing-machine, and 5 designates the base. Located at opposite ends of the machine are two cylinders A B, around which travels an endless elastic belt C, made preferably of partially-vulcanized india-rubber, although it is evident that the same may be of any other material possessing the requisite characteristics for the purpose intended. It is this belt which receives the incoming material from the feed-hopper D. The shaft of cylinder B has fixed or stationary bearings supported on the standards 3 3 of the frame, while the journals of the shaft of cylinder A are supported in movable box-bearings E, by which the said cylinder is adjusted to either contract or expand the fibers of the belt C, in order that it will be brought to the proper degree of elasticity or resiliency to both receive the grain into its body and again discharge or loosen it therefrom. The boxes E are supported by and are adjustable longitudinally in guides F, bolted to the end pieces 1 1 of the frame, as shown, and extending horizontally through each box is a screw rod or bolt G, carrying at its inner end a worm-wheel H, which gears with a worm I, formed or provided on adjacent portions of a shaft J, borne in the frame at right angles to the screw-rods, the said shaft having also at one end a hand-wheel K, through the medium of which it is turned to impart motion, through the worms and wheels, to the screws G, and thereby cause the boxes E to move in or out according to the direction of rotation of the shaft. The shaft of the cylinder B is provided at one end with the drive-wheel L, which is suitably connected with the propelling or motive power for driving the machine.

Supported in suitable bearings between the parts 3 and 4 of the frame-work, one above the other and nearest to the cylinder B, are two metallic rolls M N, the bearings for the lower one N being fixed or stationary, while those O of the upper one M are movable vertically, and are adjustable by means of screw-rods $P^2$, extending into the same and through the upper horizontal portions 2 of the frame, the said screw-rods being provided with hand-wheels P, by which they are turned to either raise or lower the bearings and roll.

The object in having the upper roll movably supported is to permit of the adjustability thereof to cause a greater or less pressure upon the belt C during its travel with the material between the two rolls, thus enabling the proper action to be had to insure the desired effect.

To the corresponding ends of the shafts of the rolls M and N, the shaft of the cylinder B and idle shaft Q, located in bearings on top of the machine, are respectively keyed or secured the sprocket-wheels R, S, T, and U, around which trends, in the manner shown, the sprocket-chain V, the arrangement being such as that no differential speed is had, thus obviating or reducing friction to a minimum, which would otherwise soon injure or wear out the endless belt C, passing between the rolls.

Supported in any suitable manner beneath the belt and contiguous to the cylinder B is a revolving scraper W, which may be operated in any suitable manner, and which is designed to scrape off the cuticle or mashed bulbs of garlic that adhere to the belt after the combined mass of material has been subjected to the action or pressure of the rolls. This scraper is preferably constructed of a number of wings having blades of rubber sufficient to have one always in contact with the belt, and it is evident that the same is intended to be revolved in a direction opposite to that traveled by the belt. As the material is carried between the rolls, the grains of wheat are pressed or embedded into the body of the belt C, while the bulbs of garlic, being of a softer nature, are mashed upon the surface thereof, and as the belt emerges from or passes through the rolls the resilient quality of the material of which it is constituted will loosen the grain, while the cuticle and pulp of the garlic-berry, being more or less saturated or impregnated with their expressed juices, will adhere to the surface of the belt until removed by the scraper W. A scraper of exactly the same construction as the foregoing and marked M'', Fig. 3, is utilized to clean the roll M of adhering pieces of pulp or cuticle and juice expressed from the garlic in its passage between the rolls. This pulp or cuticle drops from the scraper M'' to the belt C and is conveyed with the wheat to the hopper K, whence it passes into the evaporator. Also located beneath the belt, about centrally of the cylinders A and B, is a tank X, having inlet and outlets for water. This tank supports between opposite sides and transversely to the belt two rolls Z Z, each having at corresponding ends a sprocket-wheel $a$, and the surfaces of which are covered or provided with a material—as sponge—for sweeping the surface of the belt to wash and relieve it as much as possible of the juice expressed from the garlic in the passage of the wheat between the rolls. The said tank should be continuously supplied with fresh water, so as to insure perfect cleansing and to keep the sponges free of contamination by the garlic-juice. The rolls Z Z are continuously revolved or rotated by a sprocket belt or chain $b$ engaging the sprockets $a$, as shown, the said belt also passing over another sprocket-wheel $c$, carried on the corresponding end of the hopper-feed-regulating roll $d$, which carries at its other end a wheel or pulley $e$, connected by a belt $e^2$ to the shaft of the lower roll N. The motion of this roll is communicated to the tank-rolls through the sprocket chain or belt $b$, as is evident. Following after the tank beneath the belt C and located intermediate of the said tank and cylinder A is a set or series of squeegees or scrubbers $g$, which squeeze the belt clean of superfluous moisture or wet received from the washing-rolls. These devices may be constructed of any material of a sufficient rigidity for the purpose and are located and secured in position in any suitable manner. Succeeding these squeegees or scrubbers $g$ beneath the belt contiguous to the cylinder A is a fan or blower $h$, which may be supported and held in any suitable manner. The spout or nozzle of this blower is arranged at a tangent or angle to the cylinder, and thus will it be seen that a forced current of air will be projected across the surface of the belt in such manner as to carry with it any adhering material and also to dry the belt by evaporating the moisture that may be contained thereon.

In my experiments with this class of machines I have attempted the use simply of two rolls, of which one was covered with an elastic resilient material—as partially vulcanized india-rubber—and between which rolls the mass of material was fed for the purpose of separating the garlic by mashing in a manner similar to that resorted to in the present instance; but in the use of two rolls I find that it is very difficult to keep the surface of the covered roll in such clean and dry condition as is requisite to a perfect result. By the use of this invention it will be seen that so great a portion of the superficial area of the belt is being operated upon by the cleaners as to be constantly presenting a clean dry surface between the rolls.

As before stated, as soon as the material issues from between the rolls the resilient nature of the material of the belt on which it is carried will loosen the grain therefrom, and as the belt moves forward this loosened material will be precipitated by gravity into the receiving-hopper $k$ of the evaporator, which should be as near the crusher as possible. This hopper communicates with the interior of the evaporator hereinafter described, and in the bottom thereof is arranged a suitable feed-roll $l$, while working in suitable guides $m$ is a slide $n$, provided on one of its sides with notches or serrations, into which mesh or engage the teeth of a pinion $o$, carried by a small shaft $p$, extending through the walls of the hopper, and it is evident that by turning this shaft the slide $n$ may be regulated to control the supply of material to the evaporator, any suitable means being employed for holding said slide to the positions to which it may be brought. The object of this feed roll and gate is to regulate and distribute the wheat evenly across the evaporating-tanks $E'$.

Among other former inventions for the separation of garlic from wheat it has been customary to subject the combined mass to a scraping process under the action of heat; but in such instances the grains of wheat are so completely saturated or impregnated by the juices of the garlic as to render it absolutely impossible to prevent the penetration of such juices into the interior of the grain. To eradicate such juices requires a degree of heat so great as to entirely destroy the qualities of the wheat.

In the use of my invention the material is passed directly from the separator into the evaporator, for the purpose of evaporating therefrom any of the expressed juices of the garlic that may possibly be received on the outer surface in the crushing or mashing apparatus, thereby removing every possible adherence before a chance is had to penetrate, and which I find does not require a degree of heat greater than about 140° Fahrenheit.

The evaporating apparatus may be described as follows, to wit: $A'$ represents a housing or structure for inclosing the evaporating-pans, to one side of which is arranged a vertical air-trunk $B'$, which is closed at its base and communicates at its top with the interior of a fan-case $C'$, located on top of the housing $A'$, and in which is contained a fan $D'$, operated from any suitable source of power by proper connection with its pulley $c'$. The trunk $B'$ also communicates, as at 7 8 9, with the interior of several zigzag or inclined chutes $D''$, in each of which is supported an evaporating-pan $E'$, constructed of a hollow metallic box or case $e$, whose two sides project somewhat above its top, forming flanges $f$, which act to prevent the grain from falling off at the sides. These pans are preferably inclined at an angle of from thirty to thirty-two degrees from a horizontal line. In the present instance they are supported within the chutes by means of the pipes which lead to and from the boiler to supply them with steam for heating. It will be observed that the series of pipes 10, leading from the boiler, are each provided with a regulating cock or valve 11, and that they enter the upper ends of the pans at the sides through a steam-tight joint 12 (see Fig. 7) for the purpose of supplying the interior of the pans with steam. It will be further observed that the series of pipes 13, returning the exhaust to the boiler, are provided with valves 14 and communicate in like manner with the lower ends of the pans at the opposite sides, and thus are the several pans supported and kept heated continuously. The object of these valves 11 and 14 is to control the supply of steam to the tanks—that is, should I find that only one or two pans or evaporators are needed to accomplish the result desired on certain grades of wheat I can close the steam from the others, &c.

The point of communication of the trunk $B'$ with the several chutes is at the top or above the pans $E'$, while the spaces beneath the pans are open to the external atmosphere through inlets $g'$, which are preferably provided with adjustable sliding covers h', for controlling the admission of air. The sides of the chutes opposite to that referred to are formed with openings i' above and below the pans, while external to or beyond such sides is a wall F', that forms a conduit for the passage of the incoming air up over the tops of the pans, as indicated by the arrows.

It will be observed that the chutes communicate with each other, thus forming a continuous passage, and that the lower chute communicates at its extremity with a duct for conveying the grain off, as is usual in separating contrivances. This duct also communicates with a trunk M', extending up and communicating with the fan-case, through which the lighter particles are drawn off by suction after having their specific gravity reduced by evaporation.

As the material passes down over the pans the rotating fan will cause induced currents of air to pass in under the pans through the inlets g', thence through the openings i and over the tops of the pans, whence it passes up through the trunk B' and is discharged through the mouth of the fan-case. In the passage of the air beneath the pans it becomes very thoroughly heated, the bottom of the pans being blackened for retaining the heat of the steam, and it is evident that in passing across the surface of the material, traveling over the tops thereof, every possible trace of the juice expressed from the garlic will be evaporated and carried off through the trunk.

Having thus described my invention, what I claim as new, and desire to secure by Letters Patent, is—

1. The process herein described of separating garlic from wheat, which consists in first crushing or flattening out the garlic by pressure sufficient to crush the garlic but not the wheat, then separating the hulls, and finally drying the material by evaporating the juices therefrom, substantially as described.

2. The process herein described of cleaning and separating garlic from wheat, which consists in crushing or flattening out the garlic without injuring the wheat, then drying or evaporating what remains of the garlic and juices of same, and finally completing the separation by induced air currents or blasts.

In testimony whereof I have hereunto set my hand in the presence of two subscribing witnesses.

AUSTIN HERR.

Witnesses:
  CHAS. W. BALDWIN,
  JNO. M. WILLIAMS.